Figure 1:
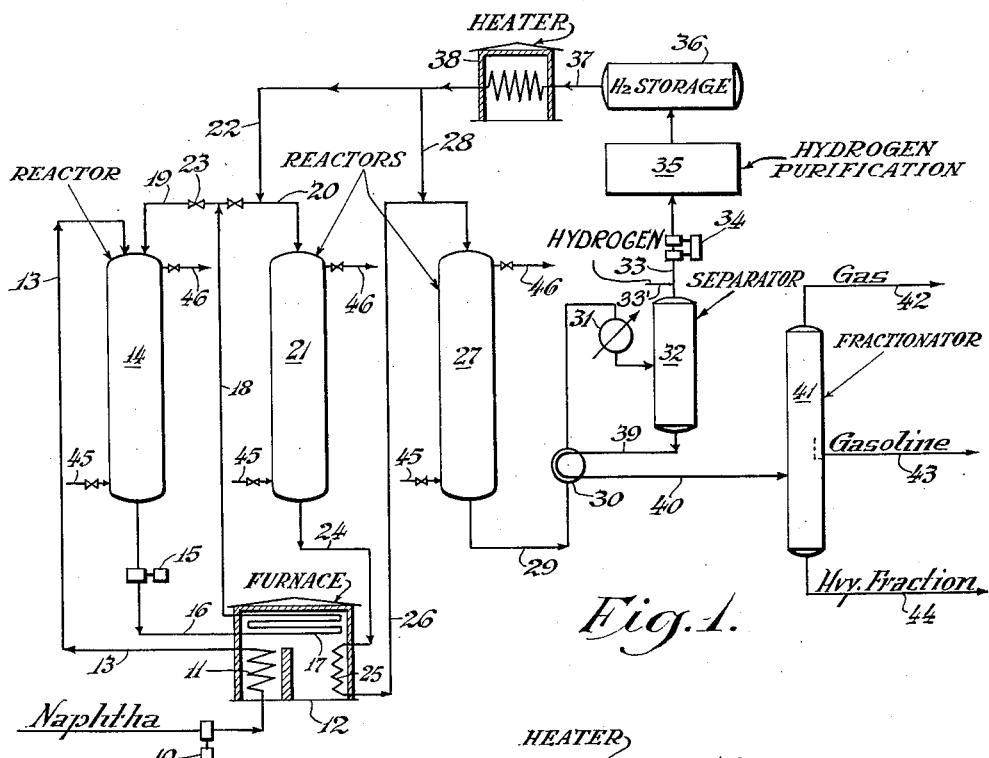

April 17, 1945. E. T. LAYNG ET AL 2,374,109

MULTISTAGE DEHYDRO-AROMATIZATION

Filed Sept. 13, 1939

INVENTORS:
Edwin T. Layng
Donald E. Payne
BY Pike H. Sullivan
ATTORNEY

Patented Apr. 17, 1945

2,374,109

UNITED STATES PATENT OFFICE 2,374,109

MULTISTAGE DEHYDROAROMATIZATION

Edwin T. Layng, Jersey City, N. J., and Donald E. Payne, Chicago, Ill., assignors of one-half to Standard Oil Company, a corporation of Indiana, and one-half to The M. W. Kellogg Company, a corporation of Delaware Application September 13, 1939, Serial No. 294,786

6 Claims. (Cl. 196—50)

This invention relates to the conversion of naphtha to high quality motor fuel by a multi-stage process of dehydrogenation and aromatization. More specifically, the invention pertains to an improved dehydro-aromatization system and to new and improved methods of operating such systems.

The object of the invention is to convert low knock rating naphtha, preferably a naphtha having a knock rating of 50 or lower to high knock rating motor fuel, preferably with an octane number of 85 to 90 or higher by the use of catalysts such as molybdenum oxide on alumina, chromium oxide on alumina and other catalysts having dehydrogenation and ring closing properties. A further object is to increase the yields of high quality motor fuel from a given naphtha.

A further object is to provide an improved multi-stage dehydro-aromatization system wherein a partially spent catalyst from one stage may be most effectively employed in another stage. A further object is to increase catalyst life and substantially to increase the period of time which a catalyst is onstream as compared with the time required for regeneration. A further object is to use the same catalyst for essentially different purposes in two successive stages under substantially different operating conditions, the first stage being essentially dehydrogenation with a small amount of aromatization and the second stage being aromatization with a small amount of dehydrogenation.

It is also an object to provide a catalytic conversion system operating in the presence of hydrogen wherein no added hydrogen is employed in the first stage and wherein the total amount of hydrogen actually produced in the first stage is ultimately employed in the succeeding stages without intermediate hydrogen separation.

A further object is to provide improved means for supplying heat to a multi-stage dehydro-aromatization system and to avoid the necessity of using unduly high amounts of superheat at any stage. A further object is to utilize the heat required for dehydro-aromatization most effectively. A further object is to utilize the heat contained in the final reaction products for revaporizing liquids after a hydrogen separation step. Other objects will be apparent as the detailed description of the invention proceeds.

In practicing our invention we preferably employ a single furnace with a plurality of separate coils. The naphtha feed stock is passed through a first coil into a catalyst chamber maintained under relatively mild conditions where dehydrogenation and perhaps a small amount of aromatization is effected at a temperature of about 875 to 925° F. Temperature as high as 1075° F. may be used at this stage if the space velocity is sufficiently high, i. e. is about 5 to 10 volumes of liquid feed per volume of catalyst space per hour. The total products and gases from this first step are then passed through a second heating coil. A part of the reheated products is recycled to the first catalyst chamber for the purpose of adding further heat thereto, supplying an atmosphere of hydrogen, and effecting further dehydrogenation. Another part of the stream from the second heating coil is introduced to a second catalyst chamber which is operated under more severe conditions, for example at a temperature of about 900 to 975° F., to which additional hot hydrogen is preferably added. The total products and gases from the second catalyst chamber are then passed through a third heating coil and into a third reaction chamber with the addition of further amounts of separately heated hydrogen, the third catalyst chamber being operated at still more severe conditions, for example temperatures of from about 975 to 1075° F. or higher. The products from this last catalyst chamber pass through a heat exchanger and cooler to a hydrogen separator, the liquids from the hydrogen separator being revaporized in the exchanger for fractionation in a conventional fractionating system. Light hydrocarbons such as methane, ethane, etc. and impurities such as H2S are scrubbed out of the hydrogen which is then heated for use in the second and third catalyst chambers, respectively.

The catalyst which has been employed under mild treating conditions is subsequently used for the more severe operating conditions so that it serves first as a dehydrogenating catalyst, then as an aromatizing catalyst before regeneration, thus materially extending the onstream catalyst periods between regeneration steps. Both dehydrogenation and aromatization reactions are highly endothermic and unless the catalyst chambers are supplied with heating means it is necessary for the charging stock to be considerably superheated. In our system we avoid unduly high superheat at each stage by providing intermediate heating steps between stages and by recycling a considerable amount of the material to the first stage so that the heat required for dehydrogenation is supplied before the hydrocarbons are subjected to severe aromatization conditions.

Figure 2:
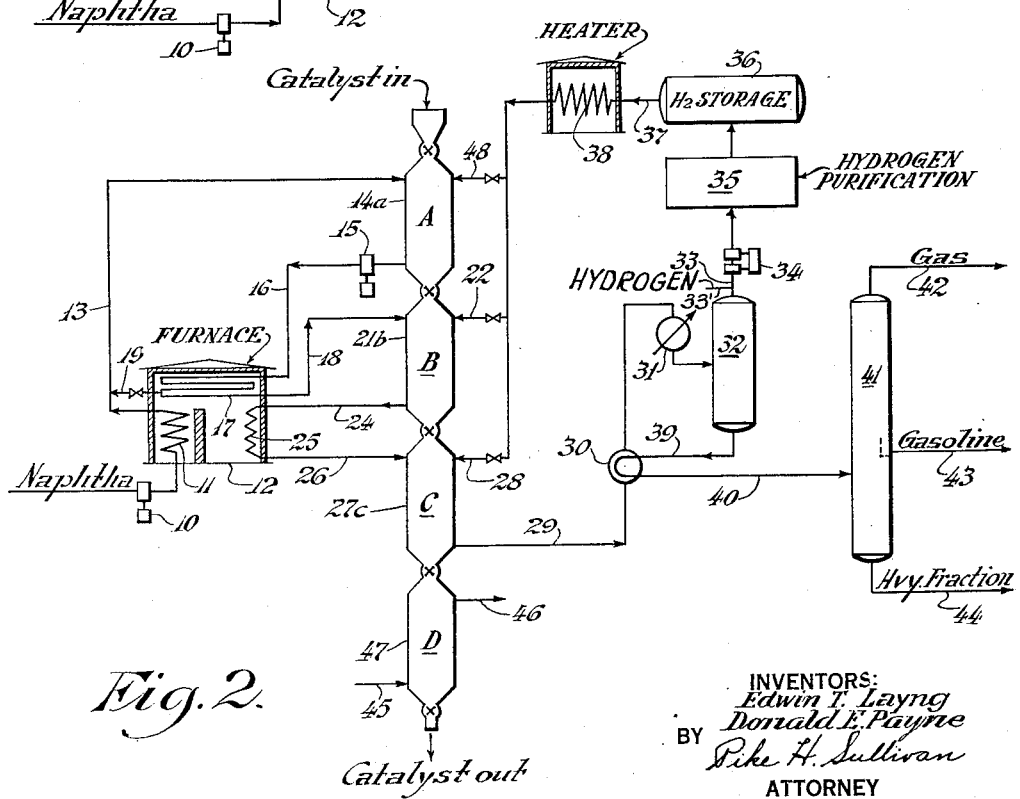

The invention will be more clearly understood from the following detailed description read in connection with the accompanying drawing which forms a part of this specification and in which:

Figure 1 is a diagrammatic flow sheet illustrating a fixed bed catalyst system; and Figure 2 is a diagrammatic flow sheet illustrating the moving bed catalyst system.

The invention is not limited to any particular naphtha, nor to a naphtha of any particular boiling range. The naphtha may be either straight run or cracked or it may be produced by the hydrogenation of carbonaceous materials, by the catalytic conversion of carbon monoxide and hydrogen or by any other known method. The boiling range may be within the limits of about 125 to 450° F. and the process is most desirable for the upper range, i. e. fractions boiling within the limits of about 300 to 450° F. Closely cut fractions may be separately treated under optimum conditions. Generally speaking, the charging stocks for the process are naphthas containing substantial amounts of straight chain paraffins or olefins having from 6 to 14 carbon atoms. Preferably charging stock is a straight run or cracked naphtha and most effective results are obtained by utilizing a stock which initially has an octane number lower than 50.

We prefer to employ as catalyst for the reforming or conversion step an oxide of a sixth group metal mounted on active alumina (a form of alumina obtained as a scale in aluminum ore purification). About 2 to 10% of molybdenum oxide on alumina or about 8 to 40% of chromium oxide on alumina have been found to give excellent results. It should be understood, however, that the present invention is not limited to any particular catalyst but is applicable to the use of any dehydro-aromatization catalyst known to the art. The minor ingredient of the catalyst is preferably an oxide or sulfide of modybdenum, chromium, tungsten or uranium or any mixture thereof mounted on bauxite, precipitated alumina, activated alumina or any other suitable catalyst. Magnesium, aluminum or zinc chromites, molybdenites, etc. may be employed since it has been found that the sixth group metal is particularly active when it is in the anion. Vanadium and cerium oxides have been found to be effective for the conversion. Oxides of copper, nickel, manganese, etc. may be included to facilitate regeneration or for supplementing catalyst activity.

The catalysts may be made by impregnating activated alumina or other support with molybdic acid, ammonium molybdate or any other catalyst compound decomposable by heat. Also, the aluminum and molybdic oxides may be co-precipitated as a gel or the separate oxides may be mixed together as a paste, dried, extruded under pressure or pelleted and heated to a temperature of about 900 to 1200° F. Since the preparation of the catalyst forms no part of the present invention it will not be described in further detail.

The catalyst may be employed in fixed beds, in movable beds or as a powder suspended in a gaseous stream, the conversion in all cases being in the vapor phase. The fixed bed catalysts may be positioned in tubes mounted, for instance, in the convection section of a furnace or they may be positioned in a single bed or plurality of beds in vertical towers or chambers. The moving catalyst may be charged to the top of a tower or tube either continuously or intermittently, the spent catalyst being withdrawn from the base of the tube at substantially the same rate; in this case the reaction takes place continuously and under substantially constant conditions of temperature and pressure, the regeneration being effected outside of the conversion zone. The powdered catalyst may be fed into a rapidly moving stream of vaporized naphtha and hydrogen, separated therefrom after the reaction is completed and separately regenerated by oxygen while suspended in flue gas. Any of these specific catalyst reactors or their equivalents may be used in practicing the invention, but they will not be described in further detail.

Referring specifically to Figure 1, naphtha is introduced by pump 10 through coils 11 of pipe still 12 and thence through transfer line 13 to catalyst chamber 14. The naphtha is heated in coils 11 and passed to catalyst chamber 14 where an average bed temperature of about 850 to 950 or 1000° F. is maintained. For example, the temperature in catalyst chamber 14 may be about 875 to 925° F., although slightly higher and lower temperatures may be used. The pressure is preferably about 30 to 450 pounds per square inch and the space velocity is such that about .1 to 10, for example 1.0 volumes of liquid naphtha feed are charged to the system per volume of free catalyst space per hour. In determining the severity of reaction conditions both temperature and space velocity must be considered, the higher space velocities usually being associated with higher temperatures. Increasing the temperature from 950 to 1000° F. at a constant space velocity may in some cases, for instance, be equivalent to operating at 950° F. and reducing space velocity by about 50%. For any given degree of severity of treatment an increase in temperature requires an increase in space velocity. Bed temperatures as high as 1075° F. may be used at correspondingly increased space velocities. Temperatures in the transfer lines from the heating coils to the catalyst beds in chambers 14, 21 and 27 may be the same as the average bed temperature but will usually be 25 or 50 and in some cases even 100° F. higher than the average catalyst bed temperature.

The catalyst in our preferred embodiment is about 6% molybdenum oxide on alumina, although it should be understood that the percentage of molybdenum oxide may be varied over fairly wide limits and that instead of molybdenum oxide we may use any other catalyst of the type hereinabove described.

All of the vapors from catalyst chamber 14 are transferred by blower 15 in line 16 to coil 17 in furnace 12. Coil 17 discharges into transfer line 18 from which a part of the hot gases are returned thru line 19 and valve 23 to catalyst chamber 14 and another part is transferred by line 20 to catalyst chamber 21. Alternatively, that portion of the material which is not recycled may be withdrawn from 14 separately and passed thru a separate heater coil (not shown) to avoid passing the total stream thru the blower. The blower 15 may be dispensed with entirely and an injector operated by gases in line 13 may draw in heated recycle products from line 19. Hot hydrogen may be introduced into line 20 thru line 22 or line 22 may introduce this hydrogen directly into the catalyst chamber 21.

The general range of pressure in chamber 21 is about 30 to 450 pounds, preferably about 250 pounds per square inch. We prefer to maintain an average temperature in catalyst chamber 21 of about 900 to 1075° F., preferably 925° F. to 1000° F., for example 975° F., although higher temperatures may be used, particularly if only two stages are employed in the system.

The space velocity of dehydrogenated charging stock may be slightly lower in catalyst chamber 21 than in chamber 14 but in any event will be within the range of 0.1 to 10 volumes of naphtha charge liquid basis per volume of catalyst space per hour, for example .8.

The amount of hydrogen introduced through line 22 will depend somewhat upon the amount contained in the gases in line 18. We prefer to add 1 or 2 mols of hydrogen per mol of charging stock at this point so that there will be about 2 to 4 mols of hydrogen per mol of charging stock in catalyst chamber 21. The mol ratio of hydrogen to naphtha entering 21 may vary from about 0.4 to 8.0.

All of the gases and reaction products from catalyst chamber 21 are passed by line 24 through coil 25 and thence through transfer line 26 to catalyst chamber 27, hot hydrogen being added through line 28 either to line 26 or directly to catalyst chamber 27. The average temperature in catalyst chamber 27 is maintained at about 900 to 1075° F., preferably 950 to 1000° F. The space velocity of charging stock through this catalyst chamber may be substantially the same as for chamber 21, for example 0.6, but additional hydrogen may be added through line 28. The pressure may be slightly lower than the pressure in catalyst chamber 21 due to flow resistance.

The final products and gases from catalyst chamber 27 are withdrawn through line 29, heat exchanger 30 and cooler 31 to hydrogen separator 32 which is preferably operated at about 35 to 105° F. The hydrogen is withdrawn through line 33 by compressor 34 through scrubber 35 to storage tank 36 from which it may be passed through line 37 and heating coil 38 to lines 22 and 28, respectively. Excess hydrogen is withdrawn from the system through line 33'.

The hydrogen purification system may be a scrubber employing single solvents or a series of different solvents for removing light hydrocarbons such as methane, ethane, propane, etc. as well as objectionable sulfur compounds such as H2S. For hydrocarbon removal the scrubbing medium or absorber liquid may be gas oil, heavy naphtha or other liquid hydrocarbon oil. For removing sulfur, we may use triethanolamine. Alternatively, the light hydrocarbons may be removed by means of activated charcoal or the hydrogen purification may be effected by a fractionation system along the line of Linde U. S. Patent 1,773,012, Claude 1,576,348, etc. The impure hydrogen gases may be cracked for the production of further amounts of hydrogen simultaneous with the elimination of hydrocarbon gases. No invention is claimed in any particular purification or concentration system and such system will not therefore be described in further detail.

The hydrogen heating coil 38 may be in a separate furnace, as illustrated, or one or more of such coils may be mounted in furnace 12, the hydrogen being heated therein preferably to temperatures higher than the temperature of the catalyst chamber into which it is introduced. Alternatively, the hydrogen may be introduced into the gaseous stream entering heater coils 17 and 25. An important feature of our invention is the elimination of the necessity of employing added hydrogen in the first catalytic stage of the process. By operating the first stage under the conditions hereinabove described we have found that no extraneous hydrogen is necessary. The recycling of a part of the products from the first stage maintains a sufficient concentration of hydrogen for effective catalyst activity and at the same time it provides an important means for adding sufficient heat to compensate for the endothermic nature of the reaction. Usually we prefer to recycle about 1 to 3 volumes of partially dehydrogenated naphtha (liquid basis) per volume of liquid naphtha charged to this first catalyst chamber. It should be noted that this recycling performs still another function; namely, it increases the linear velocity of flow through the catalyst chamber. This tends to prevent the accumulation of highly carbonaceous materials on the catalyst.

The liquid products from separator 32 are passed by pipe 39 through exchanger 30 and thence through pipe 40 to fractionator 41 from which gases may be withdrawn as an overhead stream through line 42, gasoline into the side stream through line 43, and fractions heavier than gasoline may be withdrawn from the bottom through line 44. It should be understood, of course, that any suitable type of fractionating equipment may be used and that instead of employing a single tower we may employ a plurality of columns, stabilizers, depropanizers, etc. The heavy products from line 44 may be withdrawn from the system or they may be recycled either to coil 11, coil 17 or coil 25 for further conversion.

For the sake of simplicity we have shown three catalyst chambers but it will be understood that in actual practice a considerably larger number of catalyst chambers will be employed, and these catalyst chambers will be manifolded so that any one of them may be selectively connected to any of the heating coils, while spent catalyst may be regenerated in any one or more of said chambers. The regeneration is effected by the conventional means of blowing flue gases containing regulated amounts of oxygen through the catalyst bed, gradually increasing the oxygen concentration until substantially all of the carbonaceous material has been burned from the catalyst. After the regeneration step the catalyst may be preconditioned with hydrogen, hydrocarbon gases or a mixture of hydrogen and hydrocarbon gases. Prior to regeneration, of course, each catalyst chamber will be purged. The purging, regenerating and conditioning operations do not require detailed description. For the purpose of illustration we have shown line 45 for the introduction of purge, regeneration or conditioning gases and line 46 for the withdrawal of such gases.

A feature of our invention is the multiple use of catalyst material, first for dehydrogenation and then for aromatization. Thus, when catalyst chamber 14 has been onstream for about 5 to 15 hours, preferably about 10 hours, vapors from transfer line 13 are introduced into a fresh catalyst chamber (not shown) and catalyst chamber 14 takes the place of catalyst chamber 21 in the system while catalyst chamber 27 takes the place of catalyst chamber 27 (the latter thereupon being purged, regenerated and reconditioned). Thus each particular catalyst bed is first operated under relatively mild conditions and then under considerably more severe conditions, so that it serves two distinct purposes before requiring regeneration. The naphtha undergoing conversion passes through these chambers seriatim without product separation or hydrogen removal.

The use of a catalyst which is partially spent for dehydrogenation in a subsequent stage and at higher temperatures for aromatization of the same charging stock is also illustrated in Figure 2 where the invention is shown as applied to a moving bed catalyst system. Here catalyst chambers 14, 21 and 27 are in effect superimposed so that catalyst flows first through chamber A (14a), then through chamber B (21b), thence through C (27c) and finally to regeneration chamber D (47). The regenerated catalysts from the base of chamber D is returned while it is still hot to the top of chamber A for reuse. It should be understood that this showing is diagrammatic only and that the regeneration may actually be effected in a rotary kiln or in a wedge-type furnace. Instead of using a large cylindrical chamber as illustrated we may employ a plurality of vertical pipes which are surrounded by a suitable heating fluid and instead of using the block valves illustrated for transferring catalyst from one chamber to the other we may employ any conventional means for regulating the flow of catalyst from chamber to chamber. A tight seal will, of course, have to be maintained at the top of chamber A and the bottom of chamber C, but gas leakage between A and B and B and C, respectively, is of no serious consequence.

The continuous system illustrated in Figure 2 may be a moving bed type wherein the chambers are maintained substantially full of catalyst at all times and wherein the flow of naphtha vapors may be either concurrent (as illustrated) or counter-current. Alternatively, a powdered catalyst system may be used wherein catalyst particles are suspended in the gaseous stream itself and are likewise regenerated while suspended in a stream of flue gas containing regulated amounts of oxygen. The rough separation of vapors from catalyst between chambers A and B, and B and C may be effected in cyclone separators. The particular type of catalyst reaction chambers in the system is subject to considerable variation and will not therefore be described in further detail.

For convenience the similar parts of Figure 2 are designated by the same reference characters as were used in connection with Figure 1. It will be noted that in Figure 2 line 19 is connected to an intermediate point of coil 17 instead of to transfer line 18—this expedient may also be employed in connection with the system shown in Figure 1. The regeneration system is illustrated as additional chamber 47. Certain advantages of our system may be obtained even though hydrogen is introduced through line 48 to catalyst chamber 14a, but we prefer to operate the first stage of the process without the addition of extraneous hydrogen.

In the modification shown in Figure 2 the transfer line temperatures and operating temperatures are substantially the same as those hereinabove described in connection with Figure 1 and the rate of catalyst flow through the chambers should be sufficient to give a holding time of about 1 to 20 hours (preferably about 5 to 10 hours) where the chambers are filled with catalyst. For powdered or slurry systems the holding time will, of course, be very short, sufficient to permit each particle of catalyst to remain in contact with the vapors for a period of about 2 to 60 seconds.

The feature of utilizing the heat and hot reaction products in line 29 for revaporizing the liquid from separator 32 prior to rectification or fractionation is of considerable importance from the standpoint of economics. It is desirable to separate the hydrogen from liquid hydrocarbons before these hydrocarbons are fractionated because otherwise too heavy a load would be placed on the fractionation equipment and unduly large equipment would be necessary. Heat exchanger 30 makes it commercially feasible to separate the liquid products from the hydrogen prior to the fractionation of said products.

Another feature of the invention is the use of a plurality of heating coils in a single furnace and as hereinabove stated, the hydrogen heating coils may be mounted in the same furnace. Preferably the fresh feed is heated in the convection section, and a more severe heating is effected in the hotter parts of the furnace. Thus in Figure 1 the second heating coils 17 comprise the roof tubes and the final heating coils comprise radiant tubes in the combustion section of the furnace. The partly aromatized stock can withstand higher temperatures without cracking than can the fresh feed.

While we have described a three-stage process it should be understood that the invention contemplates the use of only two stages, in which case the temperature in the second step may range from about 925 to 1050 or 1075° F. Likewise, we may employ more than three stages, and add the necessary increments of heat between the various stages by employing separate coils in a pipe still or by employing separate heaters. If only two stages are employed it will be understood, of course, that the products leaving chamber 21 through line 24 will be passed through heat exchanger 30, condenser 31, separator 32, etc. and coil 25 and chamber 27 will be cut out of the system.

While we have described preferred embodiments of our invention it should be understood that we do not limit ourselves to any of the details hereinabove set forth. Those skilled in the art may readily apply the above teachings to the conversion of any particular stock with any particular catalyst to produce any desired quality of high knock rating motor fuel.

We claim:

1. The method of reforming hydrocarbons of the naphtha boiling range to produce aromatic motor fuel of high octane number, which method comprises heating said hydrocarbons and contacting the heated vapors in a first contacting zone at a dehydrogenation temperature of at least about 850° F. with a dehydrogenation catalyst at a pressure of about atmospheric to 450 pounds per square inch and with a space velocity of about 0.1 volume to 10 volumes of liquid hydrocarbons per volume of catalyst space per hour, correlating the temperature and space velocity to effect dehydrogenation as the main reaction, passing all of the gases and vapors from the first contacting zone through a second heating coil and introducing said products from the second heating coil into a second contacting zone in contact with an aromatizing catalyst under substantially more severe operating conditions including a temperature of at least 900° F., in admixture with heated hydrogen, maintaining a hydrogen to hydrocarbon ratio in the second contacting step at about 0.4 to 8 mols of hydrogen per mol of hydrocarbon, and a pressure of about 30 to 450 pounds per square inch, separating hydrogen from the normally liquid products of the reaction, heating a part of said hydrogen and returning it to said second contacting zone, revaporizing at least a part of the normally liquid hydrocarbons and fractionating said hydrocarbons for recovering high quality motor fuel and heavier and lighter products, respectively.

2. The method of claim 1 wherein a substantial part of the heated gases and vapors leaving the second heating coil are recycled to the first contacting zone.

3. The method of converting low knock rating naphtha to high knock rating motor fuel in a multi-stage process of dehydrogenation and aromatization which comprises passing said naphtha through a first contacting zone in contact with a dehydroaromatization catalyst at a temperature of at least about 850° F. and at such space velocity as to effect dehydrogenation as the main reaction, heating the gases and vapors leaving the first contacting zone to a higher temperature of at least about 900° F., passing a part of the heated vapors back through said first contacting zone and passing another part of said heated vapors through a second contacting zone in contact with a dehydro-aromatization catalyst at a higher temperature than the temperature employed in said first zone and at such space velocity as to effect substantial amounts of aromatization, condensing the normally liquid hydrocarbons and separating the hydrogen therefrom, revaporizing and fractionating said normally liquid hydrocarbons to obtain a high quality motor fuel and passing at least a part of the separated hydrogen through a heating coil and thence to said second contacting zone.

4. The method of producing high quality motor fuel from low knock rating naphtha in a multistage dehydro-aromatization system which comprises heating naphtha in a first heating coil to a dehydrogenation temperature of at least about 850° F., contacting said heated naphtha in a first contacting zone with a dehydro-aromatization catalyst at such space velocity as to effect dehydrogenation as the main reaction, passing the products and gases from said first contacting step to a second heating coil heating said products and gases in said second heating coil to an aromatization temperature of at least about 900° F., returning a part of said vapors and gases of said heating coil to said first contacting zone and passing the remaining gases and vapors from said heating coil to a second contacting zone under sufficiently more severe operating conditions to effect substantial aromatization, and recovering high quality motor fuel from hydrogen, normally gaseous hydrocarbons and heavier hydrocarbons, respectively.

5. The method of converting low knock rating naphtha to high knock rating motor fuel in a multi-stage process of dehydrogenation and aromatization, which comprises passing said naphtha through a first contacting zone in contact with the dehydro-aromatization catalyst under such mild reaction conditions that a substantial amount of dehydrogenation, but only a small amount of aromatization, is effected, passing the entire product from said first zone through a heating zone and heating said product to an aromatization temperature of at least 925° F. in said zone, returning a part of the products from said heating zone to said first zone, passing another part of said heated products to a conversion zone maintained under sufficiently severe operating conditions to effect aromatization of straight-chain hydrocarbons, and recovering motor fuel from the products of said last named conversion zone.

6. The method of reforming hydrocarbons of the naphtha boiling range to produce aromatic motor fuel of high octane number which method comprises heating said hydrocarbons in one part of a heating zone to a temperature of at least about 850° F. for vaporizing and superheating said hydrocarbons, contacting the superheated hydrocarbon vapors with a dehydrogenation catalyst at a pressure of about atmospheric to about 450 pounds per square inch and a space velocity of 0.1 volume to 10 volumes of light hydrocarbons per volume of catalyst space per hour chiefly to effect dehydrogenation, passing all of the gases and vapors from the first contacting zone through another part of said heating zone for raising the temperature of said gases and vapors to a temperature of at least about 925° F., introducing at least a part of the reheated gases and vapors into a second contacting zone in contact with an aromatizing catalyst in admixture with heated hydrogen, maintaining a hydrogen to hydrocarbon ratio in the second contacting step of about .4 to 8 mols of hydrogen per mol of hydrocarbon, maintaining a space velocity in said second zone sufficient to effect a substantial conversion of straight-chain hydrocarbons into aromatic hydrocarbons maintaining a pressure in said second contacting step of about 30 to 450 pounds per square inch, and separating a hydrocarbon fraction of the gasoline boiling range from lighter and heavier products leaving the second contacting zone.

EDWIN T. LAYNG.
DONALD E. PAYNE.